US012447589B2

(12) United States Patent
Chun

(10) Patent No.: US 12,447,589 B2
(45) Date of Patent: Oct. 21, 2025

(54) ENGAGEMENT STRUCTURE OF RATCHET WRENCH

(71) Applicant: Chen Tzu Chun, Taichung (TW)

(72) Inventor: Chen Tzu Chun, Taichung (TW)

( * ) Notice: Subject to any disclaimer, the term of this patent is extended or adjusted under 35 U.S.C. 154(b) by 365 days.

(21) Appl. No.: 18/117,443

(22) Filed: Mar. 5, 2023

(65) Prior Publication Data

US 2024/0293920 A1 Sep. 5, 2024

(51) Int. Cl.
*B25B 23/00* (2006.01)
*B25B 13/46* (2006.01)

(52) U.S. Cl.
CPC ........ *B25B 23/0035* (2013.01); *B25B 13/463* (2013.01)

(58) Field of Classification Search
CPC .......................... B25B 23/0035; B25B 13/462
USPC .............................................................. 81/60
See application file for complete search history.

(56) References Cited

U.S. PATENT DOCUMENTS

| | | | | |
|---|---|---|---|---|
| 8,943,929 | B2 * | 2/2015 | Ou | B25B 13/463 81/60 |
| 9,931,737 | B2 * | 4/2018 | Kao | B25B 13/463 |
| 10,744,623 | B2 * | 8/2020 | Yang | H04W 36/0016 |
| 2013/0097786 | A1 * | 4/2013 | Hardinge | B25F 1/04 30/162 |
| 2019/0344406 | A1 * | 11/2019 | Chen | B25B 13/463 |

* cited by examiner

*Primary Examiner* — Hadi Shakeri
(74) *Attorney, Agent, or Firm* — LANWAY IPR SERVICES; Chun-Ming Shih

(57) ABSTRACT

An engagement structure of a ratchet wrench, the ratchet wrench contains: a body which including a drive head, a ratchet portion, and the engagement structure. The engagement structure includes a through orifice, a first defining notch, a second defining notch, a receiving notch, and a spring. An abutting member includes a first arcuate cutout, a coupling column, a locking orifice, and a first limitation protrusion. A retainer is mounted on the through orifice and includes a second arcuate cutout, a connection trough, a passing aperture, and a second limitation protrusion. When the abutting member is received in the through orifice, the first limitation protrusion is engaged in the first defining notch, the coupling column is connected with the connection trough, and a locking element is locked with the locking orifice. The second limitation protrusion is engaged in the second defining notch, and the spring abuts against the coupling column.

2 Claims, 10 Drawing Sheets

ENGAGEMENT STRUCTURE OF RATCHET WRENCH

FIELD OF THE INVENTION

The present invention relates to an engagement structure of a ratchet wrench which is moved forward and backward to engage with or remove from a socket quickly.

BACKGROUND OF THE INVENTION

A conventional ratchet wrench contains a drive head in which a ratchet orifice is defined and is configured to receive a steel ball, such that a socket is fitted with the conventional ratchet wrench by using the steel ball securely.

However, when engaging or removing the socket with or from the conventional wrench, the socket is pushed or pulled forcefully, and the steel ball or the socket will be abraded easily.

The present invention has arisen to mitigate and/or obviate the afore-described disadvantages.

SUMMARY OF THE INVENTION

The primary object of the present invention is to provide an engagement structure of a ratchet wrench which is moved forward and backward to engage with or remove from a socket quickly.

Secondary object of the present invention is to provide an engagement structure of a ratchet wrench which maintains torque of the ratchet wrench and operates the ratchet wrench in a limited spaced easily.

The primary object of the present invention is to provide an engagement structure of a ratchet wrench which is capable of operating the ratchet wrench with one hand by pushing the spring back to an original position forward easily.

To obtain above-mentioned aspects, an engagement structure of a ratchet wrench provided by the present invention, the ratchet wrench contains: a body which includes a drive head, a ratchet portion formed on an inner wall of the drive head, and the engagement structure.

The engagement structure includes a through orifice defined on the drive head, a first defining notch extending from an upper portion of a front end of the through orifice, a second defining notch extending from a lower portion of the front end of the through orifice, a receiving notch defined on a center of a rear end of the through orifice, and a spring accommodated in the receiving notch.

An abutting member is received in a top of the through orifice, and the abutting member includes a first arcuate cutout formed on a front end thereof, a coupling column extending downward from an inner surface thereof. A rear segment of the coupling column is a plane, a front segment of the coupling column is arcuate, and the abutting member includes a locking orifice defined on a bottom thereof. The abutting member further includes a first limitation protrusion extending from a top thereof.

A retainer is mounted on a bottom of the through orifice, the retainer includes a second arcuate cutout formed on a front end thereof, a connection trough defined on an inner wall of the retainer, a passing aperture formed in the connection trough, and a second limitation protrusion extending from a front end of the connection trough.

When the abutting member is received in the through orifice, the first limitation protrusion is engaged in the first defining notch, the coupling column is connected with the connection trough of the retainer, and a locking element is locked with the locking orifice of the coupling column. The second limitation protrusion of the retainer is engaged in the second defining notch, and the spring of the receiving notch abuts against the rear segment of the coupling column.

The engagement structure matches with a socket, and the socket includes a fitting portion extending on an upper end thereof, the socket further includes an operating portion extending on a lower end thereof. The fitting portion has a first trench defined around an upper section of an outer wall thereof, and the fitting portion has a second trench defined around a lower section of an outer wall thereof.

DETAILED DESCRIPTION OF THE PREFERRED EMBODIMENTS

Figure 1:
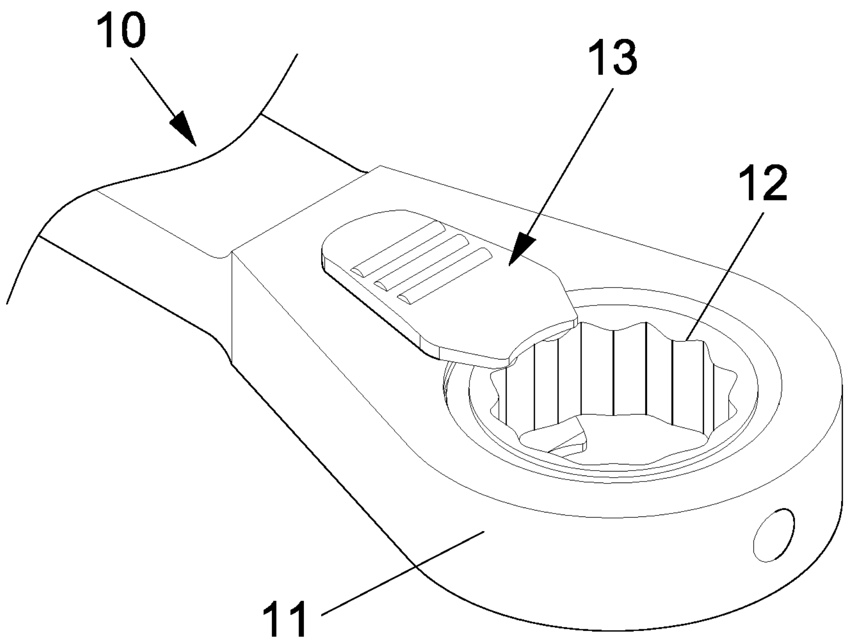
FIG. 1 is a perspective showing the assembly of an engagement structure of a ratchet wrench according to a preferred embodiment of the present invention.
Figure 2:
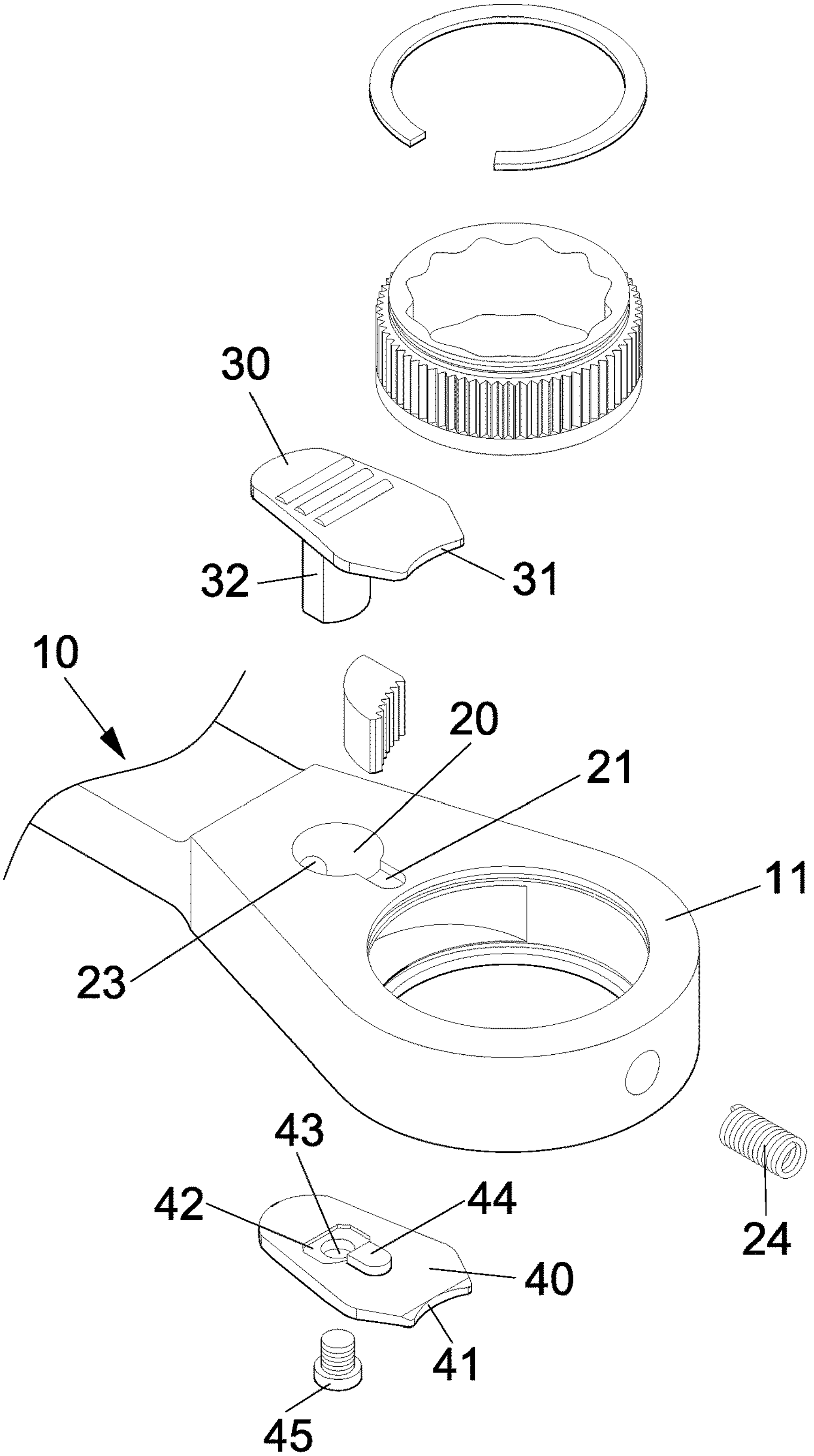
FIG. 2 is a perspective view showing the exploded components of the engagement structure of the ratchet wrench according to the preferred embodiment of the present invention.
Figure 3:
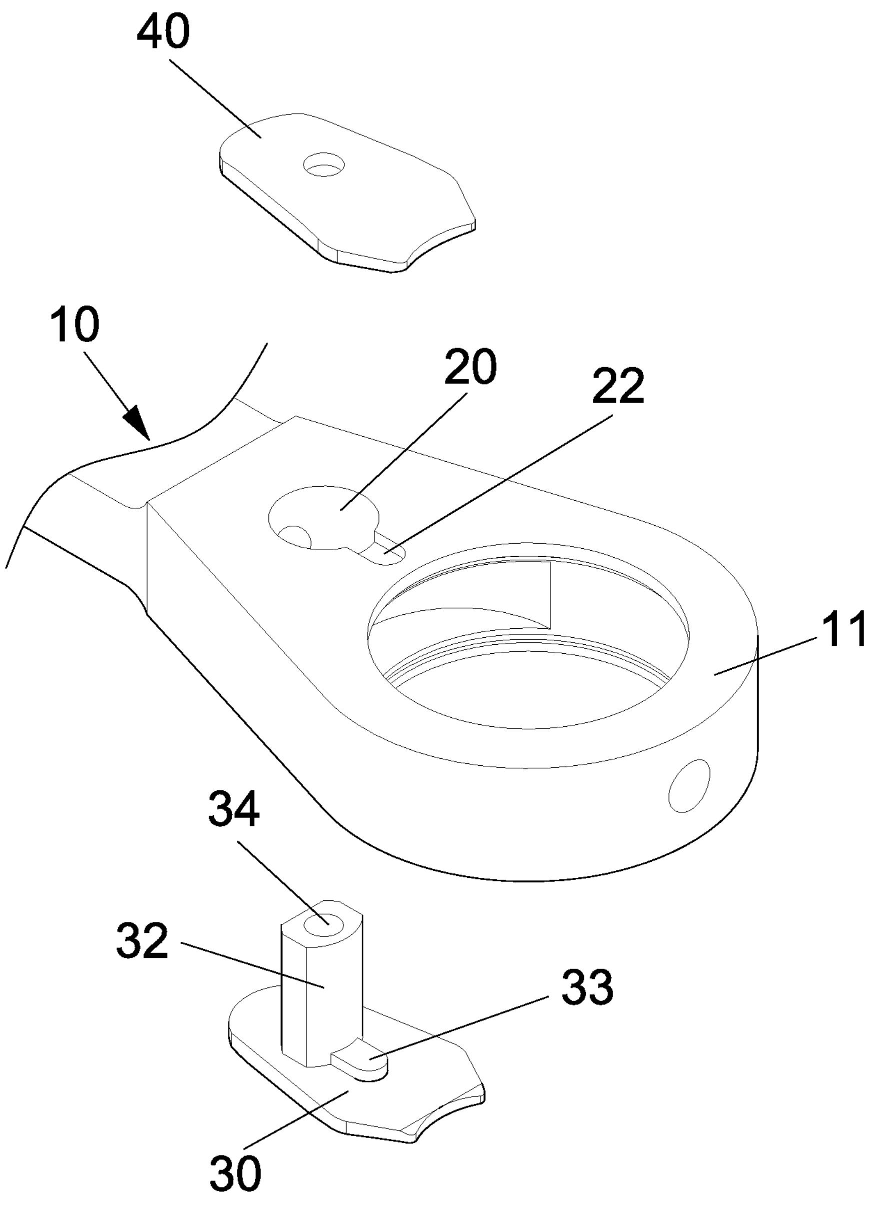
FIG. 3 is another perspective view showing the exploded components of the engagement structure of the ratchet wrench according to the preferred embodiment of the present invention.
Figure 4:
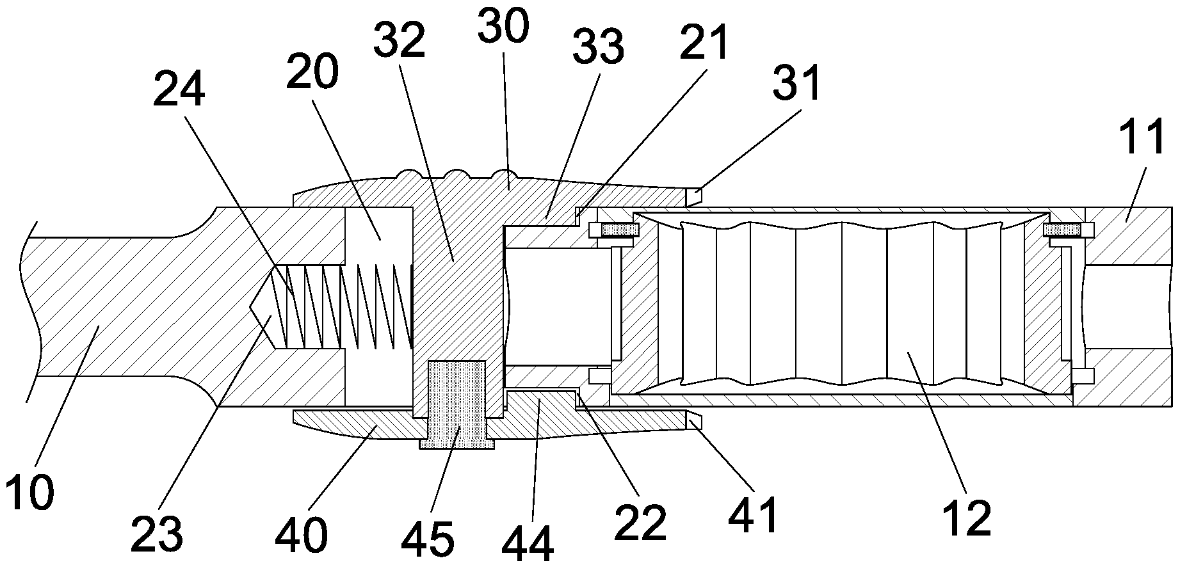
FIG. 4 is a cross sectional view showing the assembly of the engagement structure of the ratchet wrench according to the preferred embodiment of the present invention.
Figure 5:
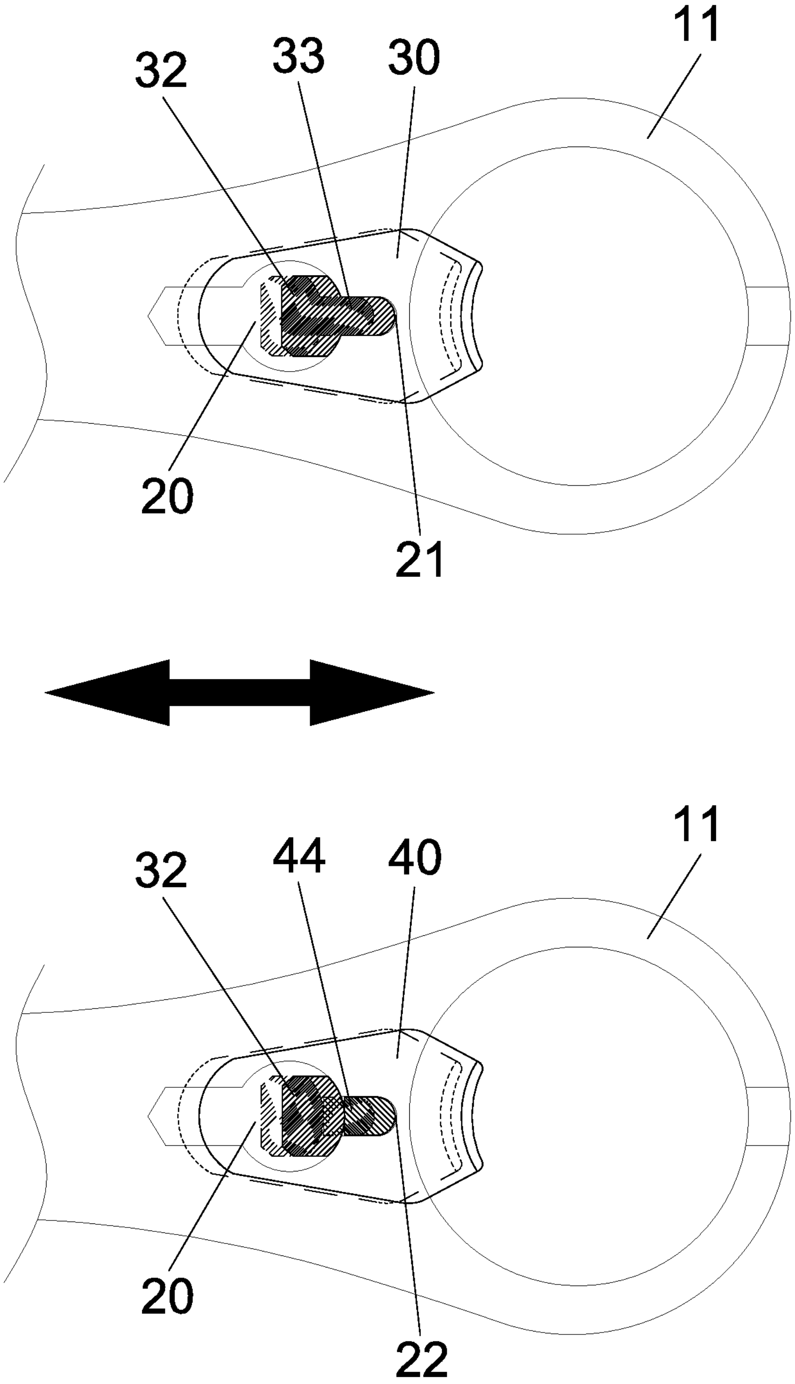
FIG. 5 is a cross sectional view showing the operation of the engagement structure of the ratchet wrench according to the preferred embodiment of the present invention.
Figure 6:
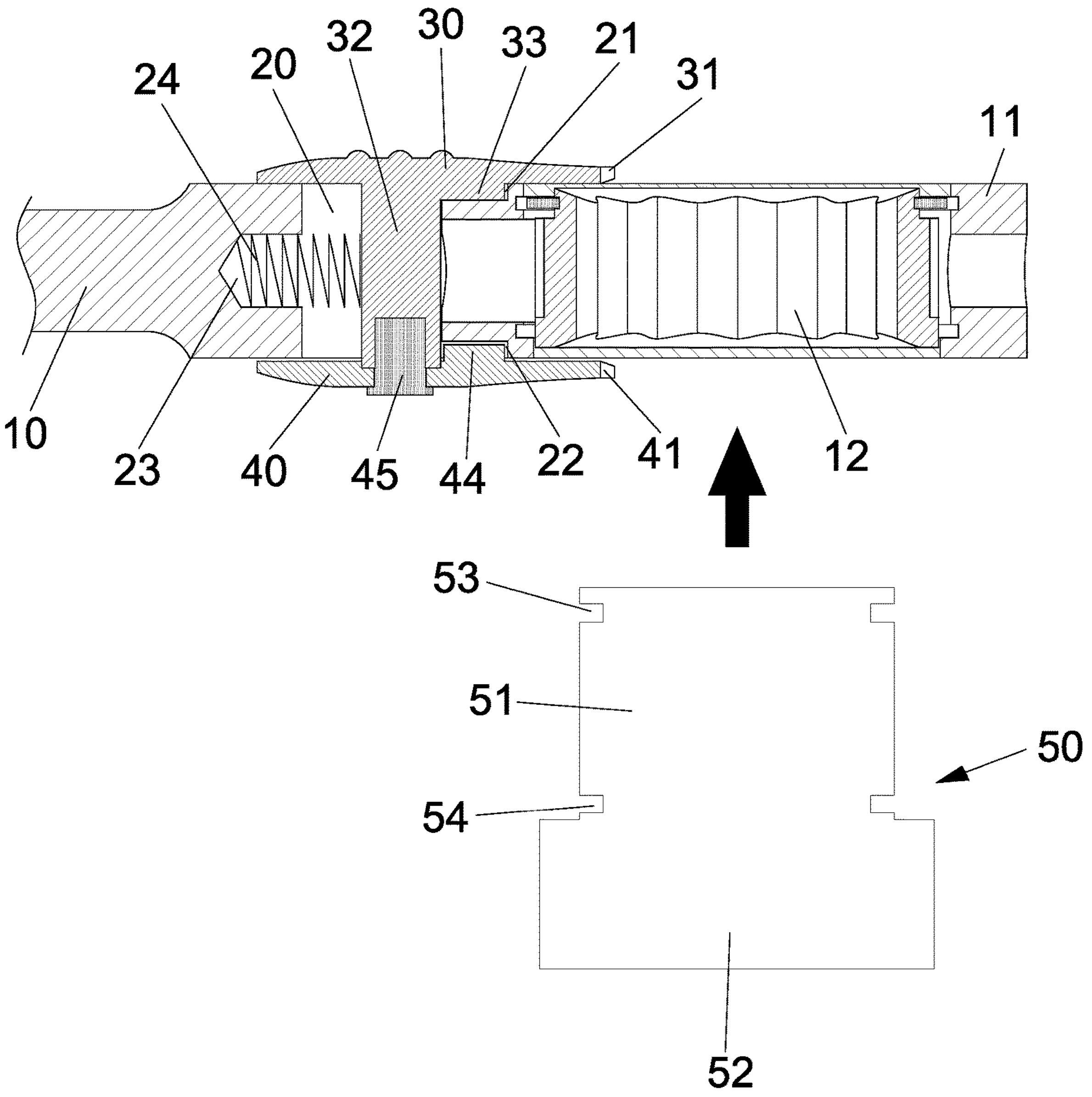
FIG. 6 is another cross sectional view showing the operation of the engagement structure of the ratchet wrench according to the preferred embodiment of the present invention.
Figure 7:
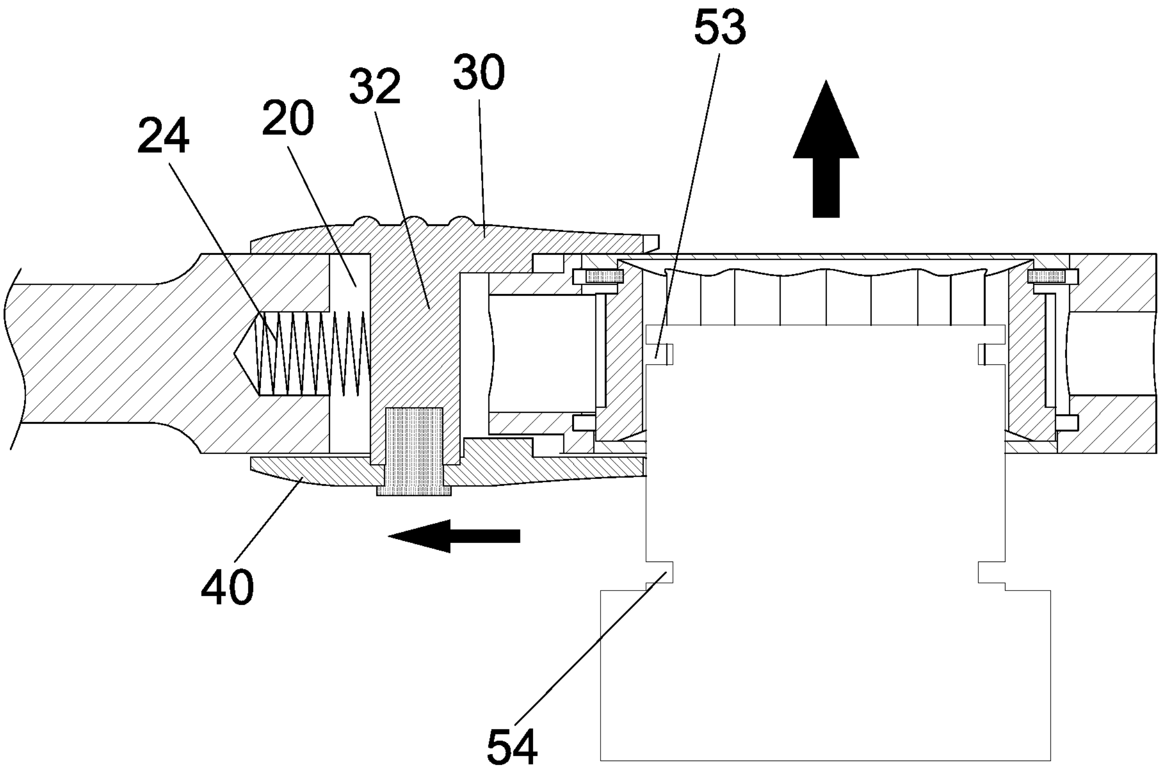
FIG. 7 is also another cross sectional view showing the operation of the engagement structure of the ratchet wrench according to the preferred embodiment of the present invention.
Figure 8:
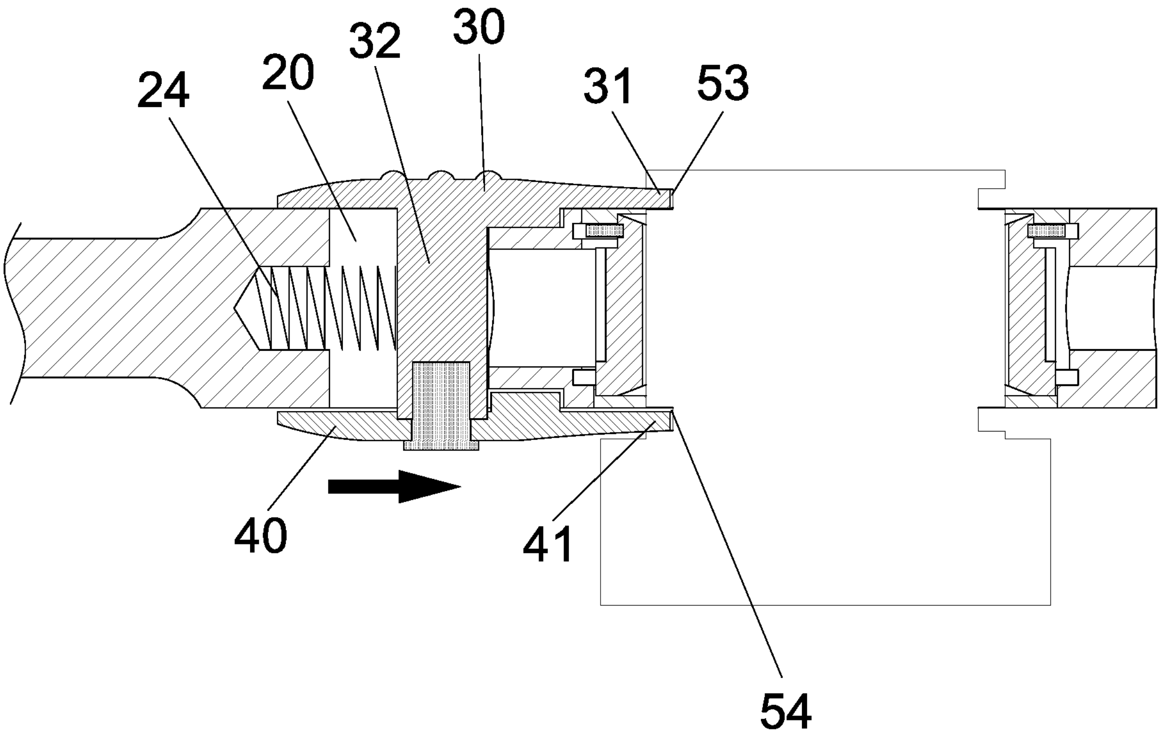
FIG. 8 is still another cross sectional view showing the operation of the engagement structure of the ratchet wrench according to the preferred embodiment of the present invention.

With reference to FIGS. 1-4, an engagement structure of a ratchet wrench according to a preferred embodiment of the present invention, the ratchet wrench comprises: a body 10. The body 10 includes a drive head 11, a ratchet portion 12 formed on an inner wall of the drive head 11, and the engagement structure 13.

The engagement structure 13 includes a through orifice 20 defined on the drive head 11, a first defining notch 21 extending from an upper portion of a front end of the through orifice 20, a second defining notch 22 extending from a lower portion of the front end of the through orifice 20, a receiving notch 23 defined on a center of a rear end of the through orifice 20, and a spring 24 accommodated in the receiving notch 23.

An abutting member 30 is received in an upper end of the through orifice 20, and the abutting member 30 includes a first arcuate cutout 31 formed on a front end of the abutting member 30, a coupling column 32 extending downward from an inner surface thereof, wherein a rear segment of the coupling column 32 is a plane, a front segment of the coupling column 32 is arcuate, and the abutting member 30 includes a locking orifice 34 defined on a bottom thereof, and the abutting member 30 further includes a first limitation protrusion 33 extending from a top thereof. A retainer 40 is mounted on a bottom of the through orifice 20, the retainer 40 includes a second arcuate cutout 41 formed on a front end thereof, a connection trough 42 defined on an inner wall of the retainer 40, a passing aperture 43 formed in the connection trough 42, and a second limitation protrusion 44 extending from a front end of the connection trough 42, such that when the abutting member 30 is received in the through orifice 20, the first limitation protrusion 33 is engaged in the first defining notch 21, the coupling column 32 is connected with the connection trough 42 of the retainer 40, and a locking element 45 is locked with the locking orifice 34 of the coupling column 32, thus fixing the retainer 40 with the abutting member 30. The second limitation protrusion 44 of the retainer 40 is engaged in the second defining notch 22, and the spring 24 of the receiving notch 23 abuts against the rear segment of the coupling column 32.

Referring further to FIGS. 5-8, in operation, the engagement structure 13 is moved forward or backward so that the abutting member 30 and the retainer 40 are fixed in the first defining notch 21 and the second defining notch 22 by using the first limitation protrusion 33 and the second limitation protrusion 44. The engagement structure 13 matches with a socket 50, and the socket 50 includes a fitting portion 51 extending on an upper end thereof, the socket 50 further includes an operating portion 52 extending on a lower end thereof, wherein the fitting portion 51 has a first trench 53 defined around an upper section of an outer wall thereof, and the fitting portion 51 has a second trench 54 defined around a lower section of an outer wall thereof, such that when the socket 50 is inserted into the ratchet portion 12, the engagement structure 13 is moved backward so that the first trench 53 of the socket 50 moves across the retainer 40, and the socket 50 is pushed upward until the first trench 53 flushes with the abutting member 30 and the second trench 54 flushes with the retainer 40, thereafter the abutting member 30 and the retainer 40 are pushed by the spring 24 so that the first arcuate cutout 31 is engaged in the first trench 53, and the second arcuate cutout 41 is engaged in the second trench 54, thus engaging the socket 50.

In contrast, the engagement structure 13 is pulled backward so that the abutting member 30 removes from the first trench 53, and the retainer 40 detaches from the second trench 54, thus removing the socket 50.

Figure 9:
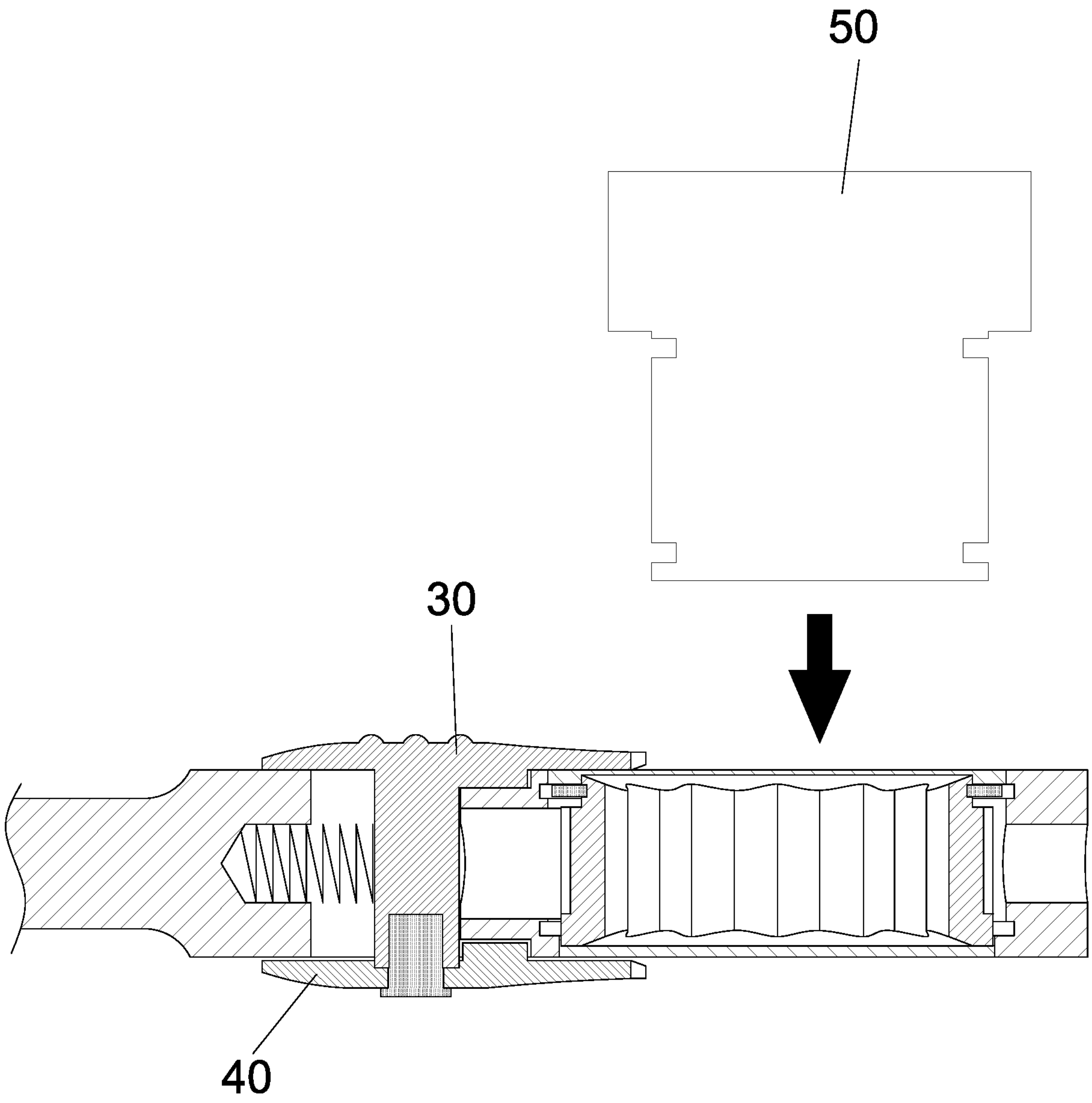
FIG. 9 is another cross sectional view showing the operation of the engagement structure of the ratchet wrench according to the preferred embodiment of the present invention.
Figure 10:
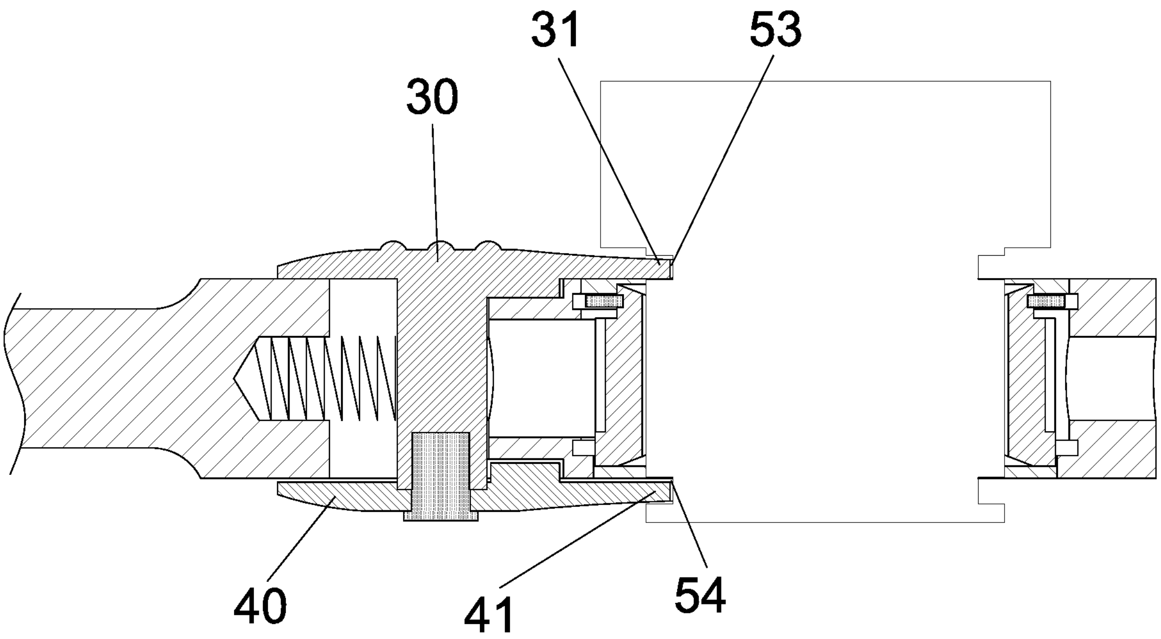
FIG. 10 is also another cross sectional view showing the operation of the engagement structure of the ratchet wrench according to the preferred embodiment of the present invention.

As shown in FIGS. 9 and 10, the engagement structure 13 is applicable for a one-way ratchet wrench. When desiring to rotate the one-way ratchet wrench in a counterclockwise direction, the socket 50 is inserted reversely, and an engagement and a removal of the socket 50 with and from the engagement structure 13 in a clockwise direction or in the counterclockwise direction are the same as above-mentioned operation.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An engagement structure of a ratchet wrench, the ratchet wrench comprising: a body which includes a drive head, a ratchet portion formed on an inner wall of the drive head, and the engagement structure;

wherein the engagement structure includes a through orifice defined on the drive head, a first defining notch extending from an upper portion of a front end of the through orifice, a second defining notch extending from a lower portion of the front end of the through orifice, a receiving notch defined on a center of a rear end of the through orifice, and a spring accommodated in the receiving notch;

wherein an abutting member is received in a top of the through orifice, and the abutting member includes a first arcuate cutout formed on a front end thereof, a coupling column extending downward from an inner surface thereof, wherein a rear segment of the coupling column is a plane, a front segment of the coupling column is arcuate, and the abutting member includes a locking orifice defined on a bottom thereof, wherein the abutting member further includes a first limitation protrusion extending from a top thereof;

wherein a retainer is mounted on a bottom of the through orifice, the retainer includes a second arcuate cutout formed on a front end thereof, a connection trough defined on an inner wall of the retainer, a passing aperture formed in the connection trough, and a second limitation protrusion extending from a front end of the connection trough;

wherein when the abutting member is received in the through orifice, the first limitation protrusion is engaged in the first defining notch, the coupling column is connected with the connection trough of the retainer, and a locking element is locked with the locking orifice of the coupling column, wherein the second limitation protrusion of the retainer is engaged in the second defining notch, and the spring of the receiving notch abuts against the rear segment of the coupling column;

wherein the engagement structure matches with a socket cprrespondingly sized and shaped, and the socket includes a fitting portion extending on an upper end thereof, the socket further includes an operating portion extending on a lower end thereof, wherein the fitting portion has a first trench defined around an upper section of an outer wall thereof, and the fitting portion has a second trench defined around a lower section of an outer wall thereof;

wherein when the socket is inserted into the ratchet portion, the engagement structure is moved backward so that the first trench of the socket moves across the retainer, and the socket is pushed upward until the first trench flushes with the abutting member and the second trench flushes with the retainer, thereafter the abutting member and the retainer are pushed by the spring so that the first arcuate cutout is engaged in the first trench, and the second arcuate cutout is engaged in the second trench, thus engaging the socket;

wherein the engagement structure is pulled backward so that the abutting member removes from the first trench, and the retainer detaches from the second trench, thus removing the socket;

wherein an engagement and a removal of the socket with and from the engagement structure in a clockwise direction or in the counterclockwise direction are the same.

2. The engagement structure of the ratchet wrench as claimed in claim 1, wherein the engagement structure is moved forward or backward so that the abutting member and the retainer are fixed in the first defining notch and the second defining notch by using the first limitation protrusion and the second limitation protrusion.

* * * * *